US011440397B2

(12) United States Patent
Maughan et al.

(10) Patent No.: US 11,440,397 B2
(45) Date of Patent: Sep. 13, 2022

(54) ELECTRIC MACHINE

(71) Applicant: AVID TECHNOLOGY LIMITED, Cramlington (GB)

(72) Inventors: Ryan Maughan, Stocksfield (GB); Christopher Hodgson, Cramlington (GB)

(73) Assignee: Avid Technology Limited, Cramlington (GB)

(*) Notice: Subject to any disclaimer, the term of this patent is extended or adjusted under 35 U.S.C. 154(b) by 67 days.

(21) Appl. No.: 16/321,255

(22) PCT Filed: Jul. 26, 2017

(86) PCT No.: PCT/GB2017/052184
§ 371 (c)(1),
(2) Date: Jan. 28, 2019

(87) PCT Pub. No.: WO2018/020245
PCT Pub. Date: Feb. 1, 2018

(65) Prior Publication Data
US 2019/0168602 A1    Jun. 6, 2019

(30) Foreign Application Priority Data

Jul. 27, 2016 (GB) ..................... 1612983

(51) Int. Cl.
*B60W 10/08* (2006.01)
*B60K 6/485* (2007.10)
(Continued)

(52) U.S. Cl.
CPC ............ *B60K 6/485* (2013.01); *B60W 10/08* (2013.01); *B60W 20/00* (2013.01); *H02K 1/246* (2013.01);
(Continued)

(58) Field of Classification Search
CPC ........ H02K 11/20; H02K 11/21; H02K 11/24; H02K 11/25; H02K 11/26; H02K 11/27;
(Continued)

(56) References Cited

U.S. PATENT DOCUMENTS 2,796,542 A * 6/1957 Bekey .................... H02K 19/24
310/162
3,132,727 A    5/1964 Meulenberg et al.
(Continued)

FOREIGN PATENT DOCUMENTS

FR    1399260    5/1965
GB    953644    3/1964
(Continued)

OTHER PUBLICATIONS

GB Search Report, App. No. GB1712061.9 dated Feb. 28, 2018.
PCT International Search Report, App. No. PCT/GB2017/052184 dated Nov. 1, 2017.

*Primary Examiner* — Burton S Mullins
(74) *Attorney, Agent, or Firm* — Temmerman Law; Mathew J. Temmerman

(57) ABSTRACT

A brushless bi-directional electric machine comprises a housing mounting exciting coils, a rotor and a stator, the exciting coils and the stator being stationary with respect to the housing and the rotor mounted for rotation with respect to the housing. The electric machine comprises a controller configured to control an exciting current supplied to the exciting coils.

12 Claims, 4 Drawing Sheets

(51) Int. Cl.
*B60W 20/00* (2016.01)
*H02P 9/48* (2006.01)
*H02P 25/03* (2016.01)
*H02P 6/08* (2016.01)
*H02P 9/30* (2006.01)
*H02K 1/24* (2006.01)
*H02K 19/10* (2006.01)
*H02K 19/24* (2006.01)

(52) U.S. Cl.
CPC ............ *H02K 19/103* (2013.01); *H02K 19/24* (2013.01); *H02P 9/48* (2013.01); *H02P 25/03* (2016.02); *H02P 6/085* (2013.01)

(58) Field of Classification Search
CPC ...... H02K 11/30; H02K 1/246; H02K 19/103; H02K 19/24; H02P 25/03; H02P 6/085; H02P 9/48; H02P 9/302; B60W 20/00; B60W 10/08; H02M 7/527; B60K 6/485
USPC ............... 322/22, 28, 59, 63; 310/162, 165, 310/177–178, 263; 318/712, 717
See application file for complete search history.

(56) References Cited

U.S. PATENT DOCUMENTS

| | | | | | |
|---|---|---|---|---|---|
| 3,766,456 | A | * | 10/1973 | Carow | H02K 29/12 318/400.41 |
| 5,383,107 | A | * | 1/1995 | Hopkins | H02M 1/12 363/41 |
| 5,493,200 | A | * | 2/1996 | Rozman | H02P 9/08 322/10 |
| 6,912,142 | B2 | * | 6/2005 | Keim | H02P 9/48 363/89 |
| 7,038,406 | B2 | * | 5/2006 | Wilson | H02P 9/305 318/139 |
| 7,132,816 | B1 | * | 11/2006 | Markunas | H02P 21/00 318/400.02 |
| 7,205,731 | B2 | * | 4/2007 | Nagayama | B60L 50/15 318/139 |
| 7,235,953 | B2 | * | 6/2007 | Aoyama | H02J 7/0047 322/28 |
| 7,592,785 | B2 | * | 9/2009 | Kimura | H02P 21/14 322/59 |
| 7,919,949 | B2 | * | 4/2011 | Namuduri | H02M 7/219 322/24 |
| 8,330,319 | B2 | * | 12/2012 | Hsu | H02K 1/246 310/216.129 |
| 8,587,229 | B2 | * | 11/2013 | Boudjemai | F02D 41/042 318/381 |
| 8,710,808 | B2 | * | 4/2014 | Kamioka | F02N 11/0862 322/44 |
| 2002/0047433 | A1 | | 4/2002 | Sekiyama et al. | |
| 2002/0074803 | A1 | | 6/2002 | Kajiura | |
| 2017/0194892 | A1 | * | 7/2017 | Granziera | H02P 29/40 |

FOREIGN PATENT DOCUMENTS

| | | |
|---|---|---|
| GB | 1012030 | 12/1965 |
| JP | 2014176114 A | 9/2014 |
| RU | 2170487 | 7/2001 |
| WO | 2018020245 A1 | 2/2018 |

* cited by examiner

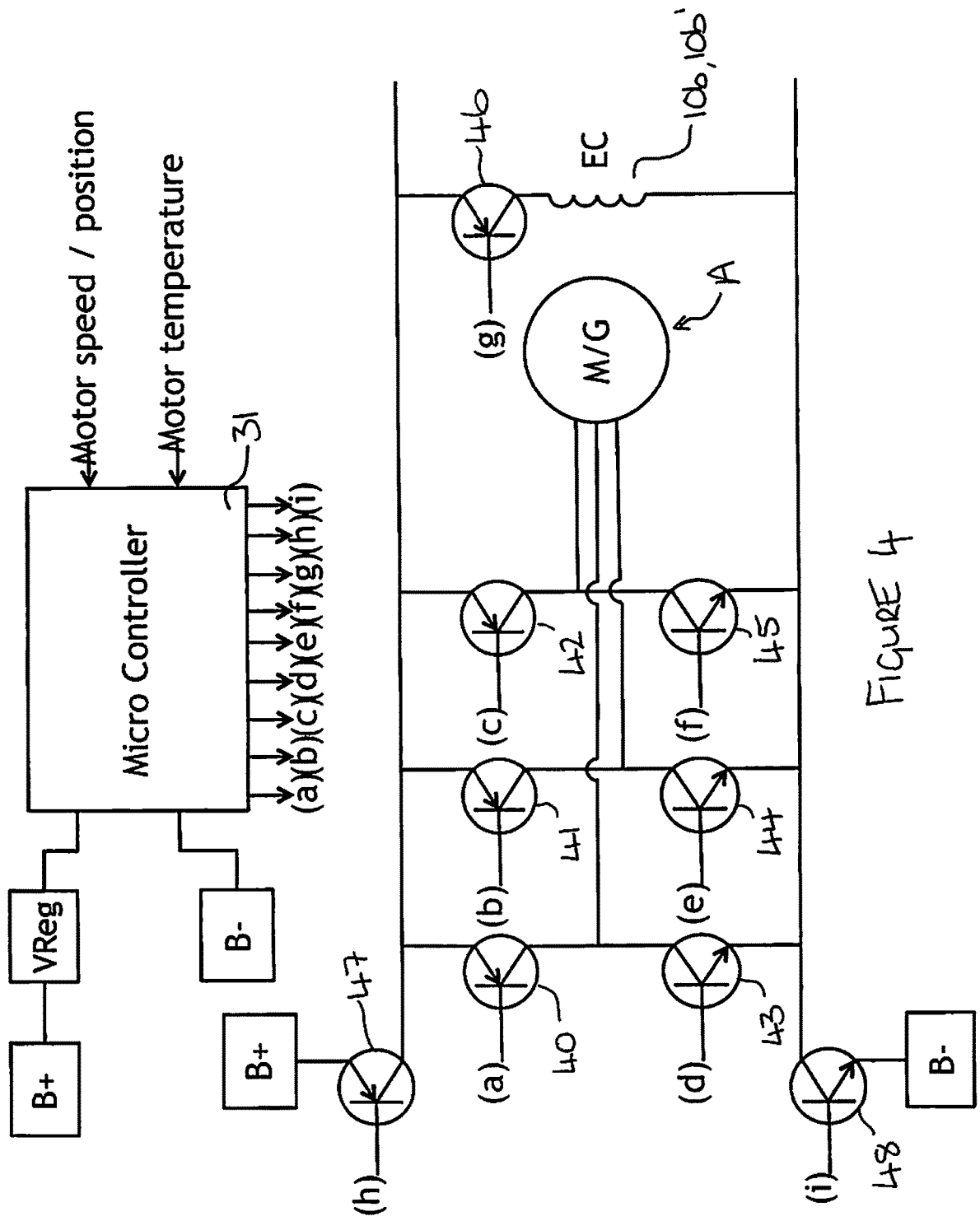

ELECTRIC MACHINE

FIELD OF THE INVENTION

The present invention relates to an electric machine and in particular to brushless alternating current electric machines where the magnetic field is created by a coil through which a current passes.

BACKGROUND OF THE INVENTION

Alternating current electric machines, be they electric motors or electric generators, typically use permanent magnets to generate the magnetic field. Where permanent magnets are used it is necessary to optimise the set up of the machine to a particular rotational speed. When the rotational speed diverges from the optimum speed, back EMFs are generated. In order to overcome back EMFs it is necessary to inject field weakening currents.

Crank assist motor generator units (CAGU) are used in motor vehicles to recover energy during coasting, deceleration and braking when the CAGU functions as a generator, and to provide motive force when the vehicle accelerates.

The optimum rotor speed when the electric machine functions as a motor is different to optimum rotor speed when the machine functions as a generator. If the machine functions as a generator maximum generation occurs at maximum speed. However, if the machine is optimised to function as a generator, where maximum generation occurs at maximum rotational speed, when the machine is operated as a motor it will be optimised to operate at low speed. This may be useful for assisting in accelerating a vehicle from low speed, but as the vehicle speed increases, the machine begins to operate outside its optimised range, which causes back EMFs, leading to the production of heat. This may require heat dissipation equipment and often it is necessary to introduce Held weakening currents into the coils of the machine to prevent damage from occurring.

One type of CAGU uses permanent magnet machines. These cannot be tuned to different optimum speeds and are considered best suited to low rotational speeds. When operated at high speeds back EMFs can be produced. Another type of CAGU uses a switched reluctance machine. Switched reluctance machines are considered best suited to high speed applications and are also used CAGUs.

It would be desirable to provide an electric machine that can be optimised to function both as a generator and a motor.

GB2247362 describes an electric machine using a conventional squirrel cage winding on a lobed rotor and which uses stationary permanent magnets a variable electromagnet coupled to the shaft to generate magnetic flux in the rotor windings. An excitation winding is mounted on the outside of the machine casing.

U.S. Pat. No. 6,373,162 describes a single rotor, dual stator axial flux machine in which a rotor spins inside an electromagnet and which uses permanent magnets in the rotor.

SUMMARY OF THE INVENTION

According to the invention there is provided a brushless bi-directional electric machine comprising a housing and mounted within the housing exciting coils, a rotor and a stator which includes stator windings, the exciting coils and the stator being stationary with respect to the housing and the rotor mounted for rotation with respect to the housing, wherein the exciting coils include windings and wherein the electric machine comprises a controller configured to control an exciting current supplied to the windings of the exciting coils.

A brushless bi-directional electric machine comprising a housing and mounted within the housing a rotor and a stator which includes stator windings, and an exciting coil located on each side of the rotor adjacent thereto, the exciting coils and the stator being stationary with respect to the housing and the rotor mounted for rotation with respect to the housing, wherein the exciting coils include windings and wherein the electric machine comprises a controller configured to control an exciting current supplied to the windings of the exciting coils, characterised in that:

the rotor includes a central part;

a peripheral structure extends axially with respect to the central part to each side thereof;

the stator is situated radially outward of the peripheral structure; and the windings of the exciting coils are situated radially inward of the peripheral structure and axially inward f an axially outermost edge of said peripheral structure.

Preferably, each exciting coil includes a winding support. More preferably, each winding support is attached to the housing. The parts of the housing to which the winding supports are attached are thermally conductive but not magnetic. The said parts of the housing may comprise plates and the plates may be removably attachable to a main body of the housing.

It is preferred that the peripheral structure and the central part of the rotor together define a cavity on each side of the central part of the rotor and an exciting coil is located in each cavity. The rotor may include a shaft sleeve and the shaft sleeve may define a part of the cavity. Alternatively or additionally, the shaft itself may define a part of the cavity.

The stator may be mounted in a stator housing which is attachable to the main body of the housing.

The housing and/or its component parts are formed of a thermally conductive but non-magnetic material;

Preferably, the controller is configured for connection to sensors adapted to sense parameters of the electric machine and/or parameters of devices connected to the electric machine.

The stator includes stator windings. Current passes through the stator windings in opposing directions depending on whether the electric machine is configured as a motor or a generator.

Preferably, the controller is configured to control a current passing between windings of the stator and a load that is electrically connected to the stator windings.

The controller may be an inverter controller;

The inverter controller may include a micro controller and half bridge circuit controlling the electric current to the exciting coils.

Preferably, the inverter controller includes a full bridge circuit comprising a micro-controller and electrical connections for connection to the stator windings.

Advantageously, the inverter controller includes a full bridge circuit comprising electrical connections for connection to the stator windings and to the micro-controller.

Preferably, the rotor comprises a shaft and the central part of the rotor comprises a disc extending radially from the shaft and the peripheral structure comprises a flange connected to the periphery of the disc, wherein the flange includes a plurality of openings, the rotor further including at least one concentrator ring, wherein the at least one concentrator ring mounts a plurality of pole pieces, each pole piece situated in one of the plurality of openings in the flange.

The rotor may comprise two concentrator rings, one positioned to each side of the disc. One concentrator ring may lie on the same plane as the disc.

The pole pieces may be in the shape of an irregular hexagon.

Preferably, the openings in the flange correspond in shape at least partially to the shape of the pole pieces, but are of large dimension, providing a space between an outer edge of the pole piece and an inner edge of the opening.

The rotor is free of windings.

Preferably, the exciting coils each comprise a support and a coil winding. The electric machine may comprise two exciting coils, one to each side of a centre line of the rotor, and preferably the coil windings of each of the two exciting coils are wound in opposite directions.

BRIEF DESCRIPTION OF THE DRAWINGS

In the Drawings, which illustrate preferred embodiments of the electric machine according to the invention:

FIG. 4 is a block/circuit diagram illustrating the control system for the electric machine of the invention.

DETAILED DESCRIPTION OF THE PREFERRED EMBODIMENTS

Figure 1:
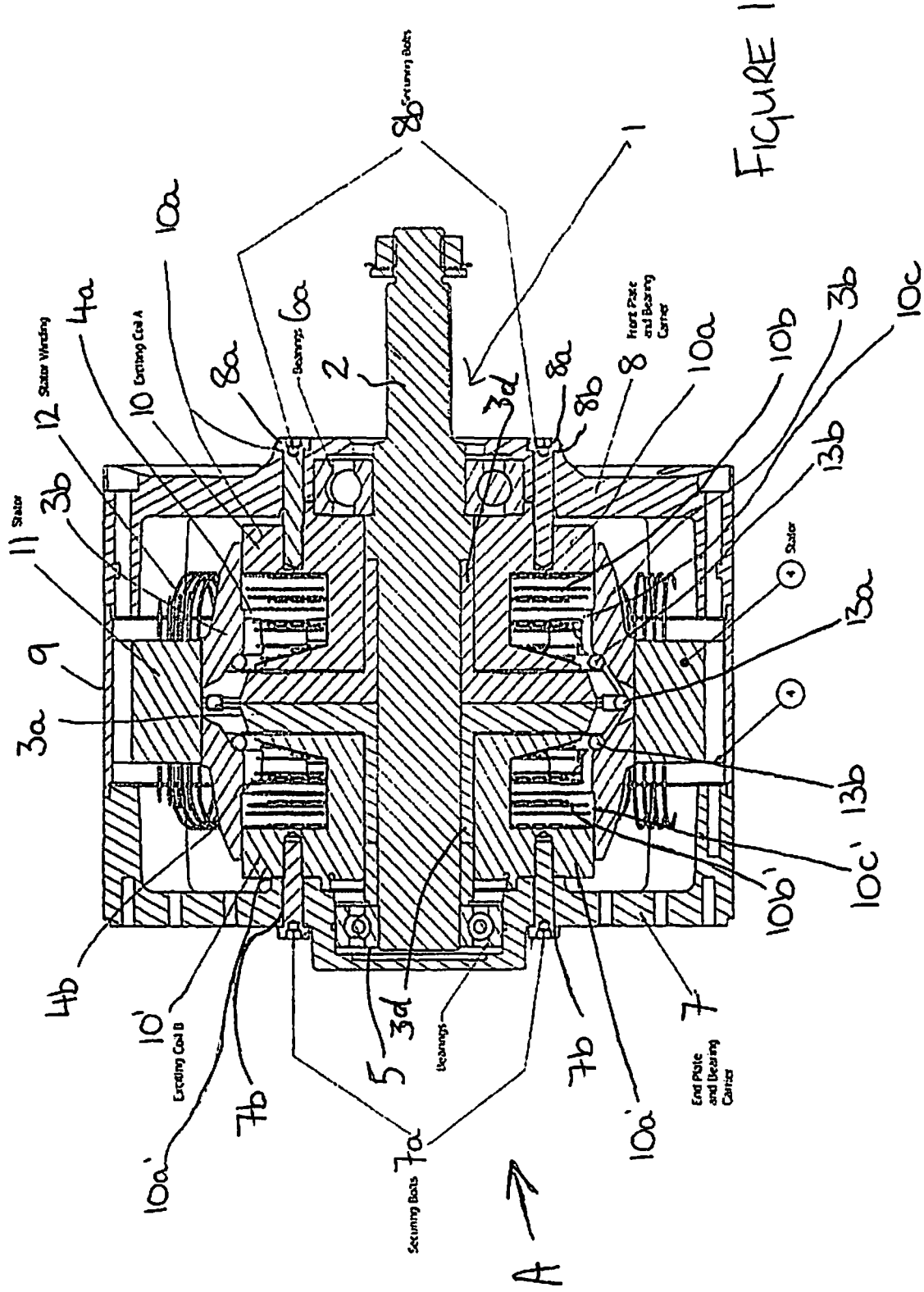
FIG. 1 is a cross-sectional elevation of the electric machine of the invention.
Figure 3:
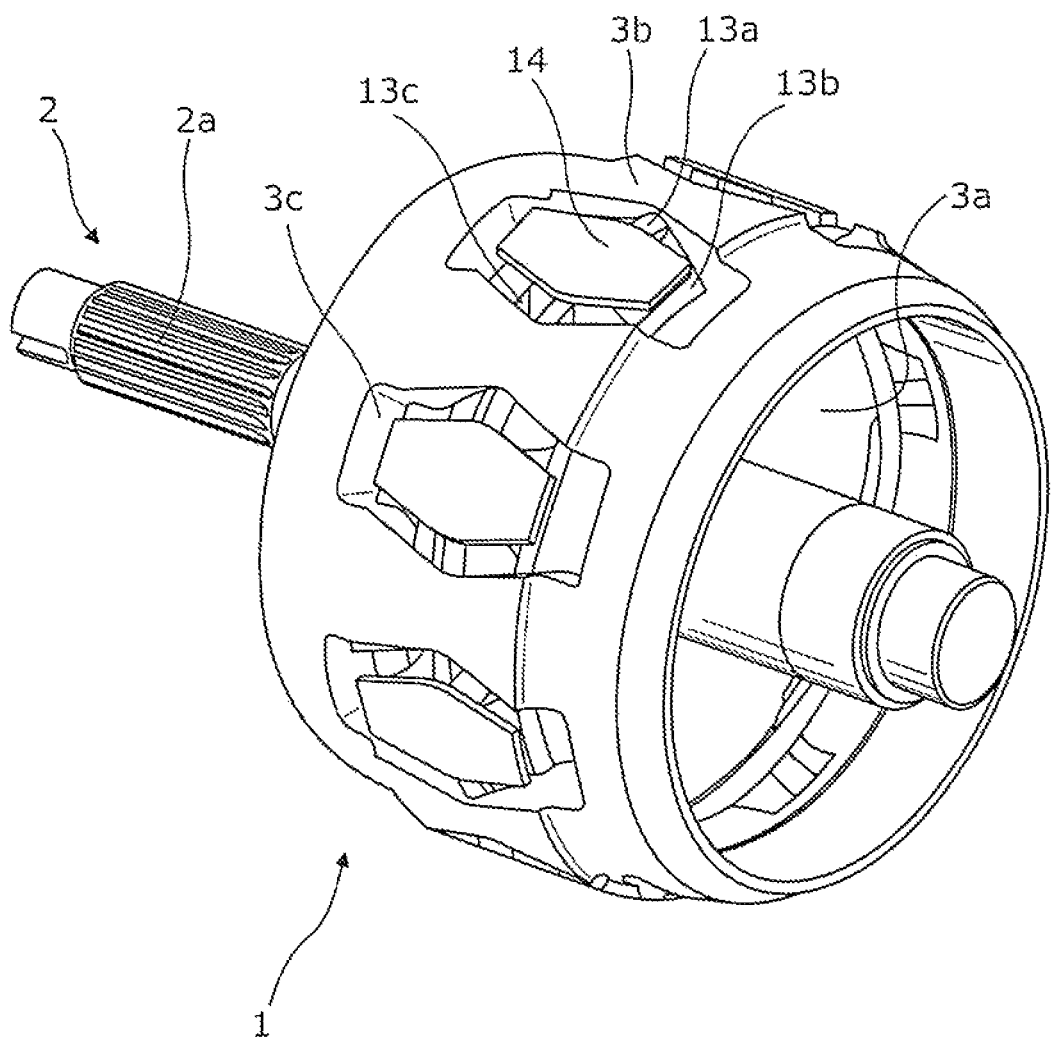
FIG. 3 is a schematic representation of the rotor of the electric machine shown in FIG. 1.

Referring now to FIGS. 1 and 3, the electric machine in the form of a crank assist generation unit A comprises rotor 1, formed of a magnetically conductive material and which includes a shaft 2 which mounts a central disc 3a and a peripheral flange 3b. The peripheral flange includes openings 3c which are shaped to surround pole pieces 14. Cavities 4a, 4b are formed by the inner surface of the peripheral flange 3b and the sides of the disc 3a. The rotor includes a shaft sleeve 3d which receives the shaft 2. The shaft sleeve 3d forms another wall of the cavities 4a, 4b.

The rotor 1 comprises a central concentrator ring 13a and outer concentrator rings 13b. The central concentrator ring 13a is attached to the rotor's central disc 3a and to the peripheral flange 3b. The outer concentrator rings 13b are attached to the peripheral flange 3b.

Pole pieces 14 of an irregular hexagonal shape are situated in the openings 3c in the flange 3b, the pole pieces 14 being attached to the central concentrator ring 13a and to outer concentrator rings 13b. The outer concentrator rings 13b are also attached respectively to the inner parts of the peripheral flange 3b to each side of the central disc 3a.

The function of the concentrator rings 13a, 13b is to concentrate magnetic flux from the stationary exciting coils 10, 10' into the pole pieces 14.

The shaft 2 of rotor 1 is mounted in two bearings 5, 6 that sit in an end plate 7 and front plate 8 respectively. The front plate 8 includes countersunk holes 8b for receiving bolts which attach to a support 10a, 10a' of one of the exciting coils 10, 10'. The end plate 7 also includes holes 7b for receiving bolts which attach to a support of the other of the exciting coils. The end plate 7, front plate 8 and a cover plate 9 together encase the machine.

The end, front and cover plates 7-9 are formed of a thermally conductive but non-magnetic material, for example aluminium.

Exciting coils 10, 10' are attached to the end and front plates 7, 8. Each exciting coil 10, 10' comprises a coil winding 10b, 10b' that is wound on a respective one of the supports 10a, 10a', each of which in the present embodiment is in the form of a metal plate. Each metal plate has a channel 10c, 10c' for receiving the winding 10b, 10b'. The coil 10b on the metal plate 10a is wound in the opposite direction to the coil 10b' wound on the metal plate 10a'. Each metal plate is attached to one of the end plate 7 and the front plate 8 by means of bolts 7b, 8b which pass through holes 7a, 8a in the respective end or front plate 7, 8 and engage with threaded holes in the metal plates. Hence the exciting coils 10, 10' are held stationary and the rotor 1 rotates relative to the exciting coils.

The stator 11 may be of a conventional stack of lamination rings or plurality of segments joined together to form a complete ring. The stator 11 has stator teeth (not shown) which are conventionally wound with conducting wire, the windings 12 in 3 phases using either a Star or Delta configuration.

When an electric current, an exciting current, is passed through coil windings 10b, 10b' of the exciting coils 10, 10' an electro-magnetic field is created. The magnetic flux associated with the electromagnetic field is concentrated by the central and outer concentrator rings 13a, 13b to the pole pieces 1-4 of the rotor 1. By controlling the exciting current the electric machine can be optimised to function as a motor where passing a current through the stator windings causes the rotor to rotate, or as a generator where rotation of the rotor causes a current to be generated in the windings, which can be sorted in battery or used by an electricity consuming device.

Figure 2:
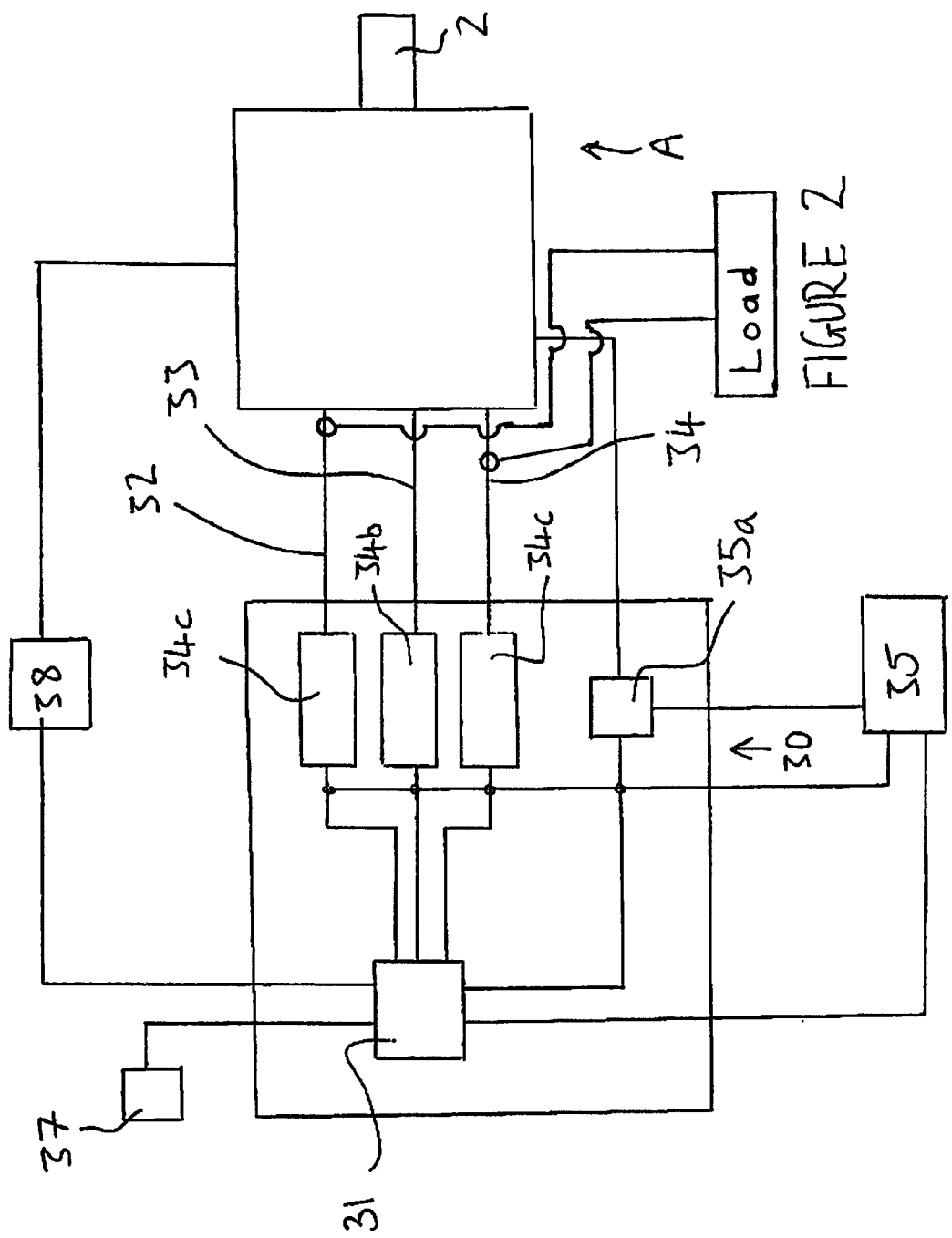
FIG. 2 is a block diagram of a control circuit of the electric machine of the invention.

FIG. 2 illustrates the control circuitry that provides for optimisation of the exciting current to suit motor and generator configurations. The electric machine controlled by the circuitry control is configured as a CAGU A. The output shaft 2 of the CAGU is connectable to the crank shaft (or other shaft driven thereby) of a vehicle, for example by a gear wheel, or belt or chain drive. When additional motive force is required, for example when accelerating from standstill, or when climbing a hill, the stator windings can draw charge from a battery (typically via an electrical power distribution circuit), causing the rotor 2 to rotate. The rotor 2 is either directly or indirectly connected to the crankshaft of the vehicle's engine. As can be seen from FIG. 3, one end of the shaft may be provided with a splined end 2a for the transfer of power to or from another rotating element. Hence, power from the output shaft can be utilised by the vehicle's transmission.

An inverter controller full bridge circuit 30 comprises a micro controller 31 and three electrical connections from the full bridge to the stator windings. Each electrical connection 32, 33, 34 is connected to a respective one of the phases of the stator winding 12.

The electrical currents supplied to each of the connections 32-34 by the full bridge circuit are pulse width modulated, the pulse width modulation being controlled by the micro controller 31.

To operate the machine 1 as a generator, the connections 32-34 are switched to a load, such as a battery (not shown). The stator windings 12 generate an AC current which the full bridge 30 rectifies to a DC output, to the load. By switching the bridge 30 to a positive DC voltage source the machine 1 is driven as a motor.

A half bridge 35a connects the DC power supply to the exciting coil 10, 10' via the connection 35. The electrical current supplied through connection 35 to the exciting coil 10, 10' is controlled by modulation of the pulse width of the said electrical current, the pulse width being controlled by micro controller 31.

With the electric machine A in a motor configuration, the micro-controller 31 senses from monitored parameters 37 such as throttle position that the power is required, the micro-controller 31 increases the pulse width modulation duty cycle so that current flows to the exciting coils 10, 10'. The rotor 1 of the electric machine A is caused to rotate, delivering rotational power to the crank shaft of the vehicle via shaft 2. For example, in one test machine increasing the duty cycle from 50% to 100% increased the current flowing to the excitation coils from 8 Amps to 16 Amps.

A shaft speed sensor 38 is arranged to sense the rotational speed of the shaft 2 and hence rotor 1 of the electric machine A, the output of the shaft speed sensor 38 forming an input to the micro-controller 31. At low speeds the duty cycle is maximised, maximising the exciting current, exciting coil field strength and power delivered to the crank shaft by the CAG U. As the rotational speed increases the duty cycle is reduced, reducing the current flowing through the exciting coil windings 10b, 10b' and the exciting coil field strength. This reduces back-EMFs that would otherwise be induced in the exciting coils/stator windings, as the speed of shaft 2 increases and therefore reduces the production of heat. Typically, a temperature sensor, for monitoring the temperature of the CAGU 1 is provided and is connected to the micro-controller 31. If the sensed temperature rises above a threshold temperature the exciting current duty cycle is reduced.

The micro-controller 31 controls the duty cycles of both the current supplied to the exciting coil windings and the current to or from the stator windings, and the duty cycle of the pulse width modulated current to the exciting coil windings 10b, 10b' is controlled relative to the duty cycle of the pulse width modulated current to or from the stator windings.

The interaction between the magnetic field generated by the current passing through exciting coils and the current passing through the stator windings 12 generates a magnetic field which causes the rotor 2, which is formed of a magnetically conductive ferrous material, to rotate. Typically, maximum output from the electric machine 1 in its motor configuration would be required at low rotor speeds. This is achieved by maximising the duty cycle of pulse width modulated current so that current flows via connection 35 to the exciting coils 10, 10'.

As the rotational speed of rotor 2 increases, so the back EMFs in the stator windings 12 increase. In the prior art, where the magnets used are permanent magnets, it is necessary to introduce field weakening currents to reduce to the stator windings, in order to reduce back EMFs and avoid damaging heating of the electric machine 1. The present invention avoids back EMFs by controlling, that is reducing the current flowing through the exciting coil windings 10b, 10b' as the rotor speed increases and thereby reducing the magnetic field strength of the electro-magnet and hence the magnetic field strength of the stator 11.

In normal driving, as the vehicle increases its speed, the requirement for additional torque to accelerate the vehicle decreases. Hence, reducing the additional power from the CAGU will not affect the performance of the vehicle adversely.

Generators in the form of alternators used in vehicles are typically either generating or not generating, and when generating driving charge to a battery irrespective of the charge in the battery. The invention allows the electric machine to be controlled so that the amount of charge delivered by the machine can be optimised to the battery's charge status or the charge requirements from other charge consumers, such as fan motors, air conditioning motors, wiper motors for example. Where the battery requires charge the electric machine may be configured so that any generated charge is delivered to the battery first.

When the micro-controller senses that the electric machine should function as a generator the micro-controller controls the duty cycle to the excitation coils 10b, 10b', which in turn controls the field strength.

FIG. 4 is a block/circuit diagram showing of the control circuitry of the electric machine. The micro-controller 31 has a multiplicity of connections, those labelled a-i being connections to the transistors 40 to 48 as indicated by the letters a-i at the respective transistor inputs. Of the transistors 40 to 48, those labelled 40 to 46 are pulse width controlled, whereas transistors 47 and 48 simply provide an on/off function and are present to turn off power to the CAGU in the event of an electrical malfunction. The transistors 40 to 45 provide the full bridge, with the transistor 46 providing the half bridge as described with reference to FIG. 2. The symbols B+ and B− represent the positive and negative terminals of the electrical power distribution circuit to which the electric machine of the invention is connected. Typically, a battery is connected to the electrical power distribution circuit. The micro controller 31 is protected from voltage fluctuations by a voltage regulator labelled VReg situated between the positive terminal B+ and the power input to the micro-controller 31.

Whilst pulse width modulation and control of the duty cycle is the means described for controlling the performance of the electric machine, other means may be used. For example, the supply voltage to the excitation coil could be varied. Increasing the voltage in the exciting coils increases the door magnetic field.

The electric machine of the invention does not suffer from the drawbacks associated with permanent magnet electric machines or switched reluctance machines. By controlling the exciting current supplied to the exciting coils the electric machine of the invention can be tuned to perform optimally at different speeds.

The invention claimed is:

1. A brushless electric machine functional as both a generator and a motor comprising a housing mounting a rotor having first and second sides in the axial direction of the rotor and a stator which includes stator windings, and first and second exciting coils, one of the first and second exciting coils located on a first side of the rotor adjacent thereto and the other of the first and second exciting coils located on a second side of the rotor adjacent thereto, the rotor and the exciting coils mounted within the housing, the exciting coils and the stator being stationary with respect to the housing and the rotor mounted for rotation with respect to the housing, wherein the exciting coils include windings and wherein the electric machine comprises a controller configured to control an exciting current supplied to the windings of the exciting coils,
wherein:
the rotor includes a central part;
a peripheral structure extends axially with respect to the central part to each side thereof;

the stator is situated radially outward of the peripheral structure;

the windings of the exciting coils are situated radially inward of the peripheral structure and axially inward of an axially outermost edge of said peripheral structure;

wherein the controller is configured for connection to sensors adapted to sense parameters of the electric machine and/or parameters of devices connected to the electric machine, the sensed parameters including at least a parameter indicative of rotor speed, wherein the controller is configured to control an electric current passing between the stator windings and a load that is electrically connected to the stator windings, wherein the controller is an inverter controller and is characterized in that the brushless electric machine is configured as a crank assist generation unit;

wherein the exciting current supplied to the windings of the exciting coils by the controller is configured according to the sensed parameters of the electric machine and/or devices connected to the electric machine and wherein when the electric machine is in a motor mode the exciting current is reduced with increasing rotor speed; and wherein the inverter controller includes a micro-controller and a half bridge circuit, the half bridge circuit comprising electrical connections to the windings of the exciting coils and controlling the electric current to the windings of the exciting coils and a full bridge circuit comprising electrical connections to the stator windings and to the micro-controller, wherein the electric current supplied to each of the electrical connections of the full bridge and half bridge circuits are pulse width modulated, wherein pulse width modulation is controlled by the micro-controller and wherein the micro-controller is configured to maximize duty cycle and thereby the exciting current, exciting coil field strength and power delivered by the rotor of the electric machine when the sensed rotor speed is low and to reduce the duty cycle with increasing sensed rotor speed.

2. A brushless bi-directional electric machine according to claim 1, wherein each exciting coil includes a winding support.

3. A brushless bi-directional electric machine according to claim 2 wherein each winding support is attached to the housing.

4. A brushless bi-directional electric machine according to claim 1, wherein the peripheral structure and the central part together define a cavity on each side of the central part of the rotor and an exciting coil is located in each cavity.

5. A brushless bi-directional electric machine according to claim 1, wherein the stator is mounted within the housing.

6. A brushless electric machine according to claim 1, wherein the controller is configured to control a current passing between windings of the stator and a load that is electrically connected to the stator windings.

7. A brushless bi-directional electric machine according to claim 1, wherein the rotor comprises a shaft, and the central part of the rotor comprises a disc extending radially from the shaft and the peripheral structure comprises a flange connected to the periphery of the disc, wherein the flange includes a plurality of openings, the rotor further including at least one concentrator ring, wherein the at least one concentrator ring mounts a plurality of pole pieces, each pole piece situated in one of the plurality of openings in the flange.

8. A brushless bi-directional electric machine according to claim 7, wherein the rotor comprises two concentrator rings, one position to each side of the disc.

9. A brushless bi-direction electric machine according to claim 8, wherein the two concentrator rings to each side of the disc are substantially aligned with an axially innermost part of the respective windings of the exciting coils.

10. A brushless bi-directional electric machine according to claim 7, wherein one concentrator ring lies on the same plane as the disc.

11. A brushless bi-directional electric machine according to claim 7, wherein the pole pieces are in the shape of an irregular hexagon.

12. A brushless bi-directional electric machine according to claim 11, wherein the openings in the flange correspond in shape at least partially to the shape of the pole pieces, but are of large dimension, providing a space between an outer edge of the pole piece and an inner edge of the opening.

* * * * *